United States Patent [19]

Kampf et al.

[11] Patent Number: 6,073,457
[45] Date of Patent: Jun. 13, 2000

[54] METHOD FOR OPERATING AN AIR CONDITIONER IN A MOTOR VEHICLE, AND AN AIR CONDITIONER HAVING A REFRIGERANT CIRCUIT

[75] Inventors: Hans Kampf, Korb; Karl Lochmahr, Vaihingen; Brigitte Taxis Reischl, Stuttgart, all of Germany

[73] Assignee: Behr GmbH & Co., Stuttgart, Germany

[21] Appl. No.: 09/049,197

[22] Filed: Mar. 27, 1998

[30] Foreign Application Priority Data

Mar. 28, 1997 [DE] Germany .................... 197 13 197

[51] Int. Cl.[7] .................................................. F25D 17/00
[52] U.S. Cl. ............................................ 62/179; 62/228.3
[58] Field of Search .................... 62/179, 178, 228.3, 62/228.1, 208, 209

[56] References Cited

U.S. PATENT DOCUMENTS

| | | | |
|---|---|---|---|
| 4,065,229 | 12/1977 | Black ........................................ | 417/270 |
| 4,706,470 | 11/1987 | Akazawa et al. ......................... | 62/209 |
| 4,951,475 | 8/1990 | Alsenz ...................................... | 62/117 |
| 5,099,654 | 3/1992 | Baruschke et al. ....................... | 62/180 |
| 5,199,855 | 4/1993 | Nakajima et al. ........................ | 417/295 |
| 5,209,076 | 5/1993 | Kauffman et al. ........................ | 62/126 |
| 5,761,918 | 6/1998 | Jackson et al. ........................... | 62/181 |
| 5,823,000 | 10/1998 | Takai ......................................... | 62/133 |
| 5,829,264 | 11/1998 | Ishigaki et al. ........................... | 62/228.3 |

FOREIGN PATENT DOCUMENTS

| | | |
|---|---|---|
| 0 085 246 | 8/1983 | European Pat. Off. . |
| 0 288 658 | 11/1988 | European Pat. Off. . |
| 0 520 628 | 12/1992 | European Pat. Off. . |
| 37 06 152 | 9/1988 | Germany . |
| 41 25 640 | 4/1992 | Germany . |

OTHER PUBLICATIONS

Patent Abstracts of Japan, vol. 17/No. 362 (M–1441) Jul. 8, 1993, abstract of Eisaku Shibuya "Capacity control device of screw type two–step compressor" Japanese 5–52195, Mar. 2, 1993.

Heinrich Drees et al., Fachbuch "Kühlanlagen", Verlag Technik GmbH, Berlin, Munich, 15th Edition, Nov. 1992, pp. 198–214.

Primary Examiner—Henry Bennett
Assistant Examiner—Marc Norman
Attorney, Agent, or Firm—Foley & Lardner

[57] ABSTRACT

An air conditioner in a motor vehicle containing a refrigerant circuit, which includes an evaporator, an output-controlled compressor that is driven by an engine, a condenser and an expansion device is provided. The evaporator and the condenser are each assigned a blower for applying an air flow. To operate the air conditioner, there is provided an electronic control device which, as a function of input signals, generates output signals for driving actuators for output-controllable components of the air conditioner. For this purpose, at least two state variables of the refrigerant circuit are detected, and the cutoff function of the compressor is determined from a comparison of (i) a value, derived from the at least two state variables and relating to the current delivery rate of the compressor, with (ii) a prescribed value for the maximum delivery rate.

20 Claims, 5 Drawing Sheets

METHOD FOR OPERATING AN AIR CONDITIONER IN A MOTOR VEHICLE, AND AN AIR CONDITIONER HAVING A REFRIGERANT CIRCUIT

BACKGROUND OF THE INVENTION

1. Field of the Invention

The invention relates to a method for operating an air conditioner in a motor vehicle, and to an air conditioner for a motor vehicle having a refrigerant circuit.

2. Description of Related Art

EP 0 288 658 B1 describes a method for controlling a motor vehicle air conditioner having a refrigerant circuit. The refrigerant circuit includes at least one output-controlled refrigerant compressor, a refrigerant condenser, an evaporator and a throttling device for the refrigerant, which is arranged upstream of the evaporator. The condenser is assigned a fan for applying air, and a blower is provided for generating an air flow through the evaporator. An electronic control circuit is fed signals from a plurality of sensors, and, taking these signals into account, output signals are calculated in the control circuit which are fed to actuators or drive elements which can be driven electrically for the purpose of influencing the compressor output, the condenser output and the evaporator output.

Refrigerant circuits in motor vehicles are continuously subjected to changing boundary conditions such as, for example, engine driving speed, cooling conditions at the condenser, loading of the evaporator on the air side and refrigerant side, and the required refrigerating performance. Of these changing conditions, the engine driving speeds, which extend over a large range between the minimum speed and the maximum speed of the internal combustion engine, represent a substantial problem for the compressor, the more so since the speed almost always is determined by the power requirements for the vehicle propulsion and not by the power requirements of the air conditioner or of the refrigerant compressor. To make it possible to provide an adequate refrigerating performance for air conditioning the passenger compartment in a motor vehicle even when the internal combustion engine is at idling speed, it is necessary to have high-volume compressors, but these are substantially over-dimensioned for the most frequent operating requirements. For this reason, motor vehicle air conditioners use output-controlled compressors in which the geometrical volumetric capacity can be varied in order to influence the compressor output. Depending on compressor type, the volumetric capacity can be varied by directly changing the stroke or controlling the closing instant of the compression chamber.

It is possible to act in various ways on components of a refrigerant circuit in order to influence its performance. For example, it is known from EP 0 520 628 A2 to reduce the condenser performance when establishing an overcompression, and to increase the condenser performance in the case of an undercompression.

SUMMARY OF THE INVENTION

Thus, there exists a need to develop an air conditioner system and a method of operating an air conditioner system for a motor vehicle that has improved performance, but does not suffer from the aforementioned problems. It is therefore an object of the present invention to provide a method for operating an air conditioner in a motor vehicle, whereby the air conditioner includes a refrigerant circuit having an evaporator, a compressor that can be driven by an engine and is output-controlled, a condenser and an expansion device. The method of operating the air conditioner in a motor vehicle operates such that it is possible, in the case of a specific mode of operation of the compressor, to act on output-controlled components of the air conditioner in such a way that the amount of energy used to operate the air conditioner is as low as possible.

It also is an object of the present invention to provide an air conditioner for a motor vehicle, whereby the air conditioner includes a refrigerant circuit having an evaporator, a compressor that can be driven by an engine and is output-controlled, a condenser and an expansion device, so that the aforementioned method of operation can be carried out with the simplest possible technical means.

In accordance with these and other objects of the invention, there is provided a method of operating an air conditioner in a motor vehicle, whereby the air conditioner includes a refrigerant circuit having an evaporator, a compressor that can be driven by an engine and is output-controlled, a condenser and an expansion device. The evaporator and the condenser each are assigned a blower for applying an airflow, and the air conditioner also includes an electronic control device which, as a function of the input signals, generates output signals for to the current delivery rate of the compressor that is derived from the compressed, with a prescribed value for the maximum delivery rate.

In accordance with additional objects of the invention, there is provided an air conditioner for a motor vehicle including a refrigerant circuit having an evaporator, a compressor that can be driven by an engine and is output-controlled, a condenser and an expansion device. The evaporator and the condenser respectively are assigned a blower and the air conditioner also has an electronic control device that is connected to sensors for the state variables selected from high pressure, compressor speed, passenger compartment temperature and outside air temperature, the control device also being connected to actuators of output-controlled components of the air conditioner. The air conditioner also includes a measuring device for measuring the voltage of the evaporator blower, and/or a measuring device for measuring the voltage of the condenser blower, as well as sensors each measuring the temperature and humidity of the air fed to the evaporator.

In accordance with additional objects of the invention, there is provided an air conditioner for a motor vehicle including a refrigerant circuit having an evaporator, a compressor that can be driven by an engine and is output-controlled, a condenser and an expansion device. The evaporator and the condenser respectively are assigned a blower and the air conditioner also has an electronic control device that is connected to sensors for detecting various state variables of the air conditioner, the control device also being connected to actuators of output-controlled components of the air conditioner. The air conditioner also includes a first sensor for detecting the pressure in a control space of the compressor and a second sensor for detecting suction pressure in a suction line of the compressor. In addition, the air conditioner contains either an evaluation circuit, arranged downstream from the first and second sensors or a differential pressure measuring sensor that can be actuated both by the control space pressure and by the suction pressure, or both.

BRIEF DESCRIPTION OF THE DRAWINGS

Exemplary embodiments of the invention are explained in more detail below with the aid of the drawing, in which.

DETAILED DESCRIPTION OF PREFERRED EMBODIMENTS

An advantage of the present invention is that the actuators for output-controlled components of the air conditioner are driven as a function of whether the compressor is operated in the destroke region or under full load. It is therefore possible in this way to reliably prevent the expenditure of a great deal of energy to operate the refrigerant circuit, while at the same time, the compressor is operated in a destroke region. This is important, in particular, with regard to electrically driven blowers that can be used, for example, for condenser ventilation. Because of the poor efficiency chain, specifically internal combustion engine—generator—electric motor—blower, the additional fuel consumption owing to the higher air throughput is larger than the saving in the driving power of the compressor.

In order to obtain in a particularly simple mechanism by which a signal that reliably informs whether the compressor is in a power range outside its maximum delivery rate, it is advantageous for the suction pressure of the refrigerant and the pressure in the control space of the compressor to be measured, and, for a differential signal to be formed from the corresponding signals. As an alternative to this, it also is possible, however, for the suction pressure and the high pressure of the refrigerant as well as the speed of the compressor shaft to be detected. It is important in this case to include the current speed of the compressor shaft, since the extreme system-induced changes have a substantial effect on the compressor performance.

A further possibility for establishing whether the compressor is being operated outside its maximum delivery rate consists in determining the refrigerating performance by calculation, the value for the maximum delivery rate being compared with the actual performance value. For this purpose, the high pressure of the refrigerant, the compressor speed, the inside air temperature, the outside air temperature, the humidity of the air fed to the evaporator and the voltage of a blower assigned to the evaporator are detected, and the corresponding signals are used to calculate a comparison value for the maximum delivery rate of the compressor, which is compared with an actually measured value. This development of the method has the advantage that the calculation can be performed on the basis of parameters of such sensors as are also used for further operations to control or regulate the air conditioner. These sensors already belong to a considerable extent to the usual equipment of the motor vehicle air conditioner, and so there is no need for any appreciable extra expenditure in order to establish reliably the compressor's delivery state.

A further possibility for determining the destroke condition of the compressor consists in calculating it from the parameters decisive for an evaporator characteristic, specifically the voltage of the blower assigned to the evaporator, the air inlet temperature and humidity of the air flowing into the evaporator, the refrigerant temperature on the output side of the evaporator and the position of the respective air flaps in the flow channels of the air conditioner, as well as from a comparison with the value prescribed for the refrigerating performance at maximum delivery rate.

It is possible, moreover, to determine the destroke condition of the compressor by calculating the refrigerating performance at maximum delivery rate from the parameters decisive for a condenser characteristic and from a comparison with the value of the actual refrigerating performance. It is possible in this case for the condensing unit characteristic to be calculated taking account of the compressor speed, the voltage of a blower assigned to the condenser, and the driving speed. As an alternative to this, however, it is possible to take into account that the calculation of the condensing unit characteristic is performed taking account of the compressor speed, the high pressure of the refrigerant and the temperature of the refrigerant on the output side of the condenser, and of the suction gas temperature.

In a development of the method according to the invention, it can also be expedient to detect the suction pressure, the high pressure, the suction gas temperature and the speed of the compressor shaft, and to calculate from the corresponding signals the value of the hot gas temperature for operating at maximum delivery rate of the compressor, and to compare this result with the actually measured hot gas temperature.

It is particularly important to undertake control of the condenser blower as a function of the destroke condition of the compressor, that is to say the voltage of the condenser blower is reduced given the presence of a signal for the destroke condition of the compressor and taking account of the required refrigerating performance. In this case, the voltage of the condenser blower can be infinitely adjustable, or else can be adjusted in one or more steps. In order to avoid excessively frequent consecutive changes of the controls and to prevent oscillations in the control system, it is advantageous that the reduction in the voltage is performed at a lower delivery rate of the compressor than the rise in the voltage.

Figure 1:
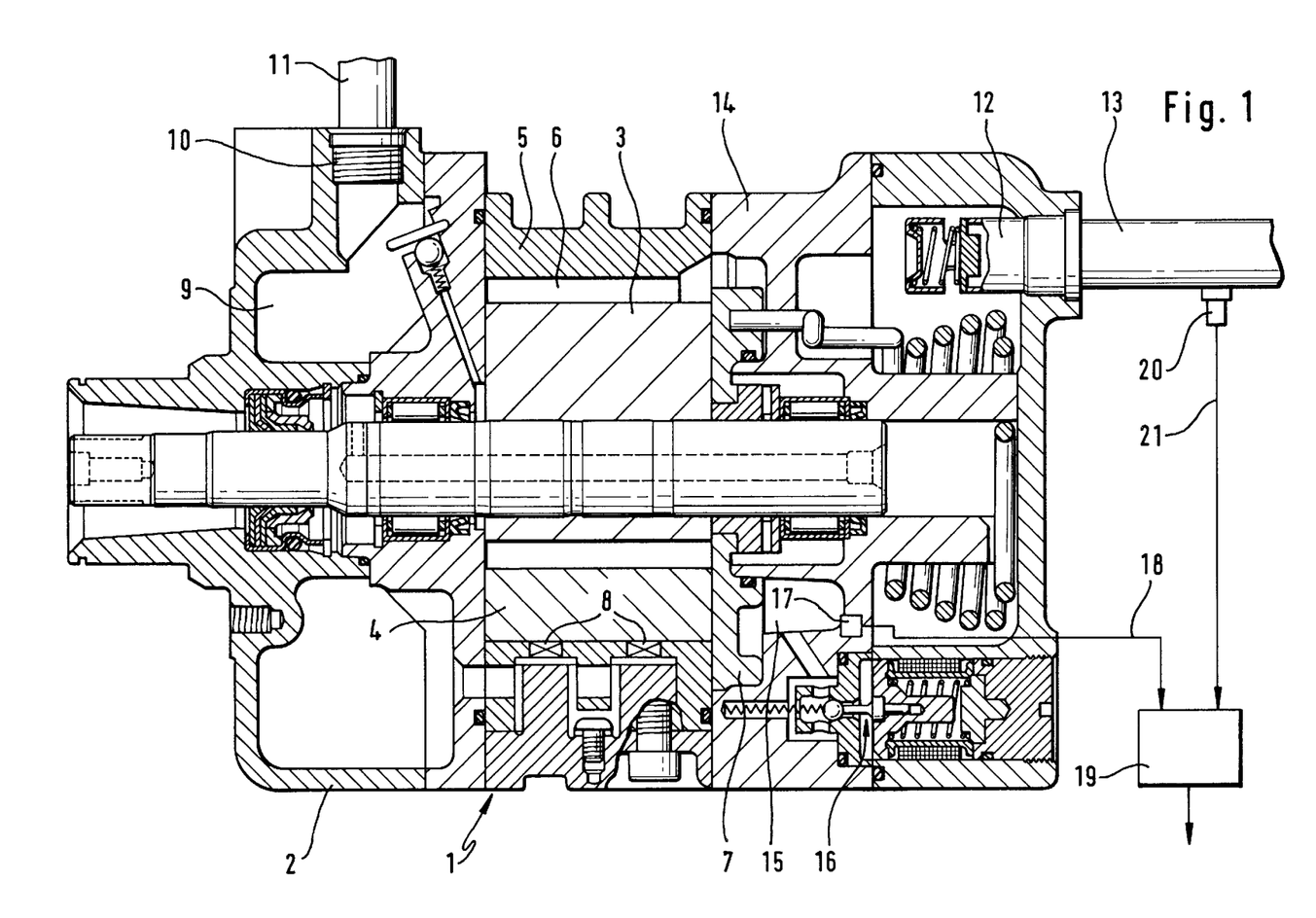
FIG. 1 illustrates an arrangement for determining a differential pressure across a compressor.

FIG. 1 illustrates a vane compressor 1 having a rotor 3 rotatably mounted in housing 2. The rotor 3 contains a plurality of vanes 4, which are guided in radial slots and perform a radial movement as the rotor rotates. A middle section of the housing 2 forms a displacement ring 5 whose inner wall surface is designed as a displacement curve. The axial movement of the vanes is produced by this contour during rotation of the rotor. Formed between the displacement ring 5 and rotor 3 are a plurality of compression chambers 6 into which, depending on the angular position of the rotor as referred to a control plate 7 arranged at the front upstream of the rotor 3, refrigerant is sucked into the compression chamber 6 from a suction connection 12. The rotation of the rotor 3 reduces the volume of the compression chambers 6 and thus compresses the refrigerant until it passes through pressure valves 8 into a delivery pressure chamber 9.

Located in the housing 2 is a high pressure connection 10, which is connected to the delivery pressure chamber 9 and to a high pressure line 11. The end of a suction line 13 is held in the suction connection 12. A control space 15 is constructed between a housing part 14, which bears on the suction side against the displacement ring 5, and the control plate 7, it being possible to influence the pressure prevailing in the control space by means of a control valve 16. Depending on the pressure prevailing in the control space 15, the rotary angle position of the control plate 7 is adjusted with respect to the displacement ring 5, as a result of which the filling level of the compression chambers 6 is determined. It is possible in this case to make an adjustment between the maximum volumetric capacity of the compressor 1 and volumetric capacities which are reduced with respect thereto, the so-called destroke condition of the compressor.

Arranged on the wall bounding the control space 15 in the housing part 14 is a pressure sensor 17 which detects the pressure respectively prevailing in the control space 15 and feeds corresponding signals to an evaluation device 19 by means of an electric connection 18. Provided on the suction line 13 is a further pressure sensor 20 which sends signals to the evaluation device 19 by means of an electric connection 21 in accordance with the respective suction pressure. An output signal formed from the difference between the signals supplied by the pressure sensors 17 and 20 is generated in the evaluation device 19 and is available as a parameter for appropriate control functions of the air conditioner. Thus, it is possible with the aid of this signal to establish whether the compressor 1 is in the state of maximum volumetric capacity or in the destroke condition. Establishing this is important for driving actuators for output-controlled components of the air conditioner.

Figure 2:
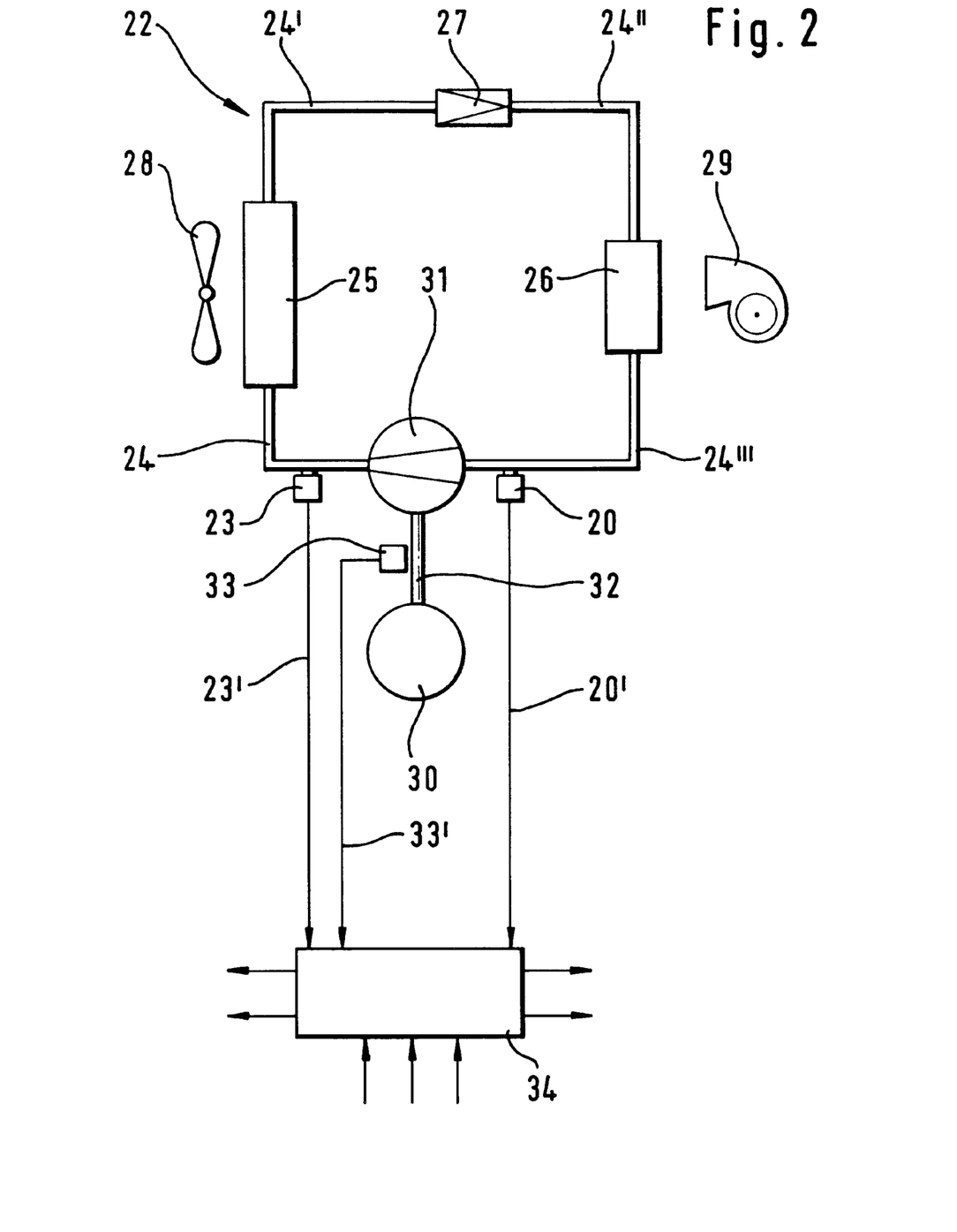
FIG. 2 shows a diagrammatic representation of a refrigerant circuit having sensors for detecting states which serve to determine the destroke operation of the compressor.

FIG. 2 shows a refrigerant circuit 22, which comprises a compressor 31, a condenser 25, an evaporator 26 and an expansion valve 27. The individual units 25, 26, 27, 31 are interconnected by means of pipelines 24, 24', 24", 24'". The refrigerant circuit 22 is filled with a suitable refrigerant including, for example, an oil-containing refrigerant such as R134a, and the like. The condenser 25 is assigned a condenser blower 28, and an evaporator blower 29 is provided for generating an air flow through the evaporator 26. The compressor 31 is coupled to an engine 30 by means of a drive shaft 32, said engine being, for example, an internal combustion engine driving a motor vehicle.

The suction pressure sensor 20 is arranged on the pipeline 24'" on the suction side of the compressor 31, and a high pressure sensor 23 is provided on the high pressure side of the compressor 31 on the pipeline 24. A tachometer 33 is located in the direct vicinity of the drive shaft 32 in order to detect the respective speed at which the compressor 31 is being operated. The sensors 20, 23, 33 are connected to an electronic control device 34 by means of connecting lines 20', 23', 33'. The signals generated by the sensors 20, 23, 33 are fed to the electronic control device 34 so that it can be determined from these signals in the control device whether the compressor is being operated at maximum delivery capacity or is in the destroke region. The electronic control device 34 is also fed further parameters, these being state variables here which are relevant for the air conditioning operation. Depending on the input variables and, in particular, depending on the volumetric capacity set for the compressor, the electronic control device 34 generates output signals which serve to drive output-controlled components of the air conditioner.

Figure 3:
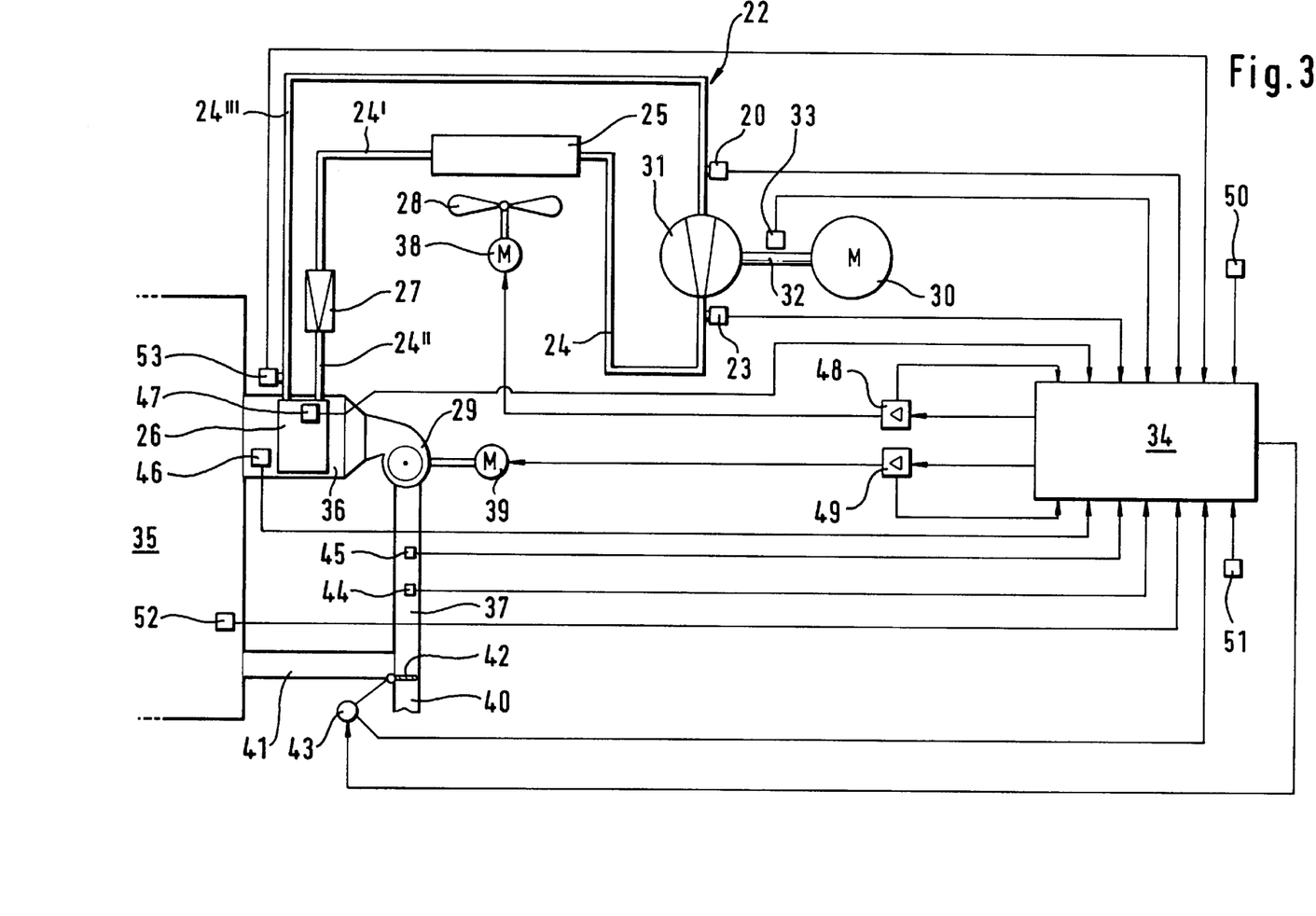
FIG. 3 shows a diagrammatic representation of an air conditioner in a motor vehicle having an electronic control unit for generating signals for actuators of drives.

FIG. 3 depicts a refrigerant circuit 22 that corresponds in design to that described with reference to FIG. 2. It is shown in the exemplary embodiment of FIG. 3 that the evaporator 26 is arranged in a supply air channel 36 for a passenger compartment 35 of a motor vehicle. Arranged upstream of the evaporator 26 in the air flow direction is the evaporator blower 29, which is connected on the suction side to an air guidance channel 37. Opening into the front end of the air guidance channel 37 is a fresh air channel 40 and a recirculating air channel 41, which can optionally be connected to the air guidance channel 37 by means of an air flap 42. The air flap 42, which is constructed as a fresh air/recirculating air flap, is coupled to a positioning motor 43, which is driven by the electric control device 34. The respective current position of the positioning motor 43 is detected and a corresponding signal is sent to the control device 34.

Sensors 44 and 45 are located in the air guidance channel 37, sensor 44 detecting the humidity, and sensor 45 detecting the temperature, of the air fed to the evaporator 26. A temperature sensor 46 is provided in the supply air channel 36 on the outflow side of the evaporator 26, and a temperature sensor 47 is located inside the evaporator block. The arrangement also comprises the outside temperature sensor 50 and passenger compartment temperature sensor 52, which are customary in motor vehicle air conditioners. Furthermore, it is possible when calculating output signals in the electronic control device 34 to take account of the respective vehicle speed, for which reason a vehicle speed sensor 51 is provided. In addition to the sensors 20 and 23, already described in relation to FIG. 2, for the suction pressure and the high pressure in the refrigerant circuit 22 in FIG. 3, there is arranged on the refrigerant circuit 22 on the output side of the evaporator 26 a refrigerant temperature sensor 53 whose signal is required for determining the overheating temperature.

The condenser blower 28 is driven by an electric motor 38, which is connected to a power electronics system 48. The evaporator blower 29 is coupled to an electric motor 39, which is connected to a power electronics system 49. The power electronics systems 48 and 49 are driven by output signals of the electronic control device 34 so that the electric power which can be fed to the motors 38 and 39 can be set. A corresponding signal for the electric power correspondingly set is fed back to the electronic control device 34.

Not all the sensors described are required in an air conditioner; a few of the sensors represented suffice to uniquely determine defined states, in particular for approximate calculation of state variables. Determining the characteristic of the subsystem of evaporator/expansion element, and determining the characteristic of the subsystem of condenser/compressor are suitable for calculating the refrigerating performance in the case of maximum volumetric capacity of the compressor and for making a comparison with the actual performance. For a given geometry and known performance characteristics of a motor vehicle air conditioner and, in particular, of the air conditioner contained therein, the following sensor signals can be used to calculate the characteristic of the evaporator/expansion element subsystem:

Voltage of the drive motor for the evaporator blower;

Temperature and humidity of the air added to the evaporator;

Refrigerant temperature on the output side of the evaporator; and

Settings of the air flaps and, in particular, the fresh air/recirculating air mode.

The characteristic of the condenser/compressor subsystem can be calculated from the following sensor signals:

Compressor speed;

Voltage of the motor for the condenser blower; and

Driving speed.

As an alternative to this, the characteristic of the condenser/compressor subsystem can also be determined from the compression speed, the high pressure, the refrigerant temperature on the outflow side of the condenser, and by the suction temperature. The refrigerating performance of the evaporator if the compressor were operating at full volumetric capacity is situated at the intersection of the characteristics of the two subsystems and the condensing unit characteristics. The evaporator output temperature which would result if the compressor were to operate at full volumetric capacity can be determined from the refrigerating performance and from the signal for the blower voltage, as well as from the operating state of the air conditioner with regard to the fresh air/recirculating air mode and, if appropriate, the setting of further air flaps. This comparison of the calculated magnitude for the air temperature on the outflow side of the evaporator with an air temperature measured by the sensor 46 downstream of the evaporator 26 thus shows whether the compressor 31 is in the destroke condition. Since no sudden changes are produced because of the thermal inertia of the system, it is expedient for the sensor signals to be damped, for example, by time averaging, in the case of determining the characteristics as well.

An approximate calculation which suffices to detect whether a compressor is operating in the destroke region requires virtually exclusively signals from those sensors which already belong in the customary range of equipment in a motor vehicle air conditioner. These include, for example, the high pressure, the motor voltage of the evaporator blower, the compressor speed and the passenger compartment temperature and the outside temperature. In addition, the sensor 44 can be provided to determine the humidity of the air fed to the evaporator 26.

Figure 4:
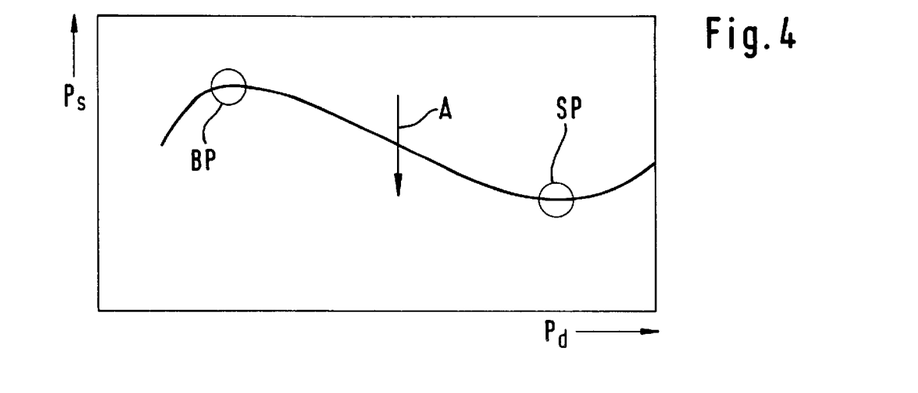
FIG. 4 shows a control curve for an output-controlled compressor.

FIG. 4 shows a control curve for output-controlled compressors, which is valid, in particular, for the vane compressor represented in FIG. 1. In the diagram represented in FIG. 4, $P_s$ specifies the suction pressure, and $P_d$ the high pressure. The lowest point on this curve is denoted as the set point SP. From this point onward, the compressor begins to reduce its delivery rate as a function of high pressure, suction pressure and speed. If the high pressure in the air conditioner decreases further, the destroke pressure is displaced to a higher level. The highest point on the curve is denoted as the break point BP. At this point, the compressor has reached its smallest volumetric capacity. From this point on, as high pressure drops further the compressor behaves like a compressor with a fixed swept volume, that is to say, there is no further change in the delivery rate.

Since the control curve is a function of the speed of the compressor and of the evaporator load, the control curve is displaced depending on these parameters. The arrow A indicates that with rising speed and dropping evaporator load the control curve is displaced downwards, as a result of which the break point BP is likewise displaced to the right. The matching of the control curve to the refrigerant circuit is to be undertaken while meeting the following requirements:

A set point SP which is as low as possible in order to achieve a high cooling rate;

A break point BP as far to the left as possible in conjunction with low high pressures, in order to reliably avoid evaporator icing in the case of low outside temperatures and high compressor speeds; and Ensuring a constant evaporating pressure, there being a need to observe the pressure drop in the suction line, which drops with a low evaporator load.

The destroke region of the compressor is defined by the section of the control curve which is situated between the set point SP and the break point BP.

Figure 5:
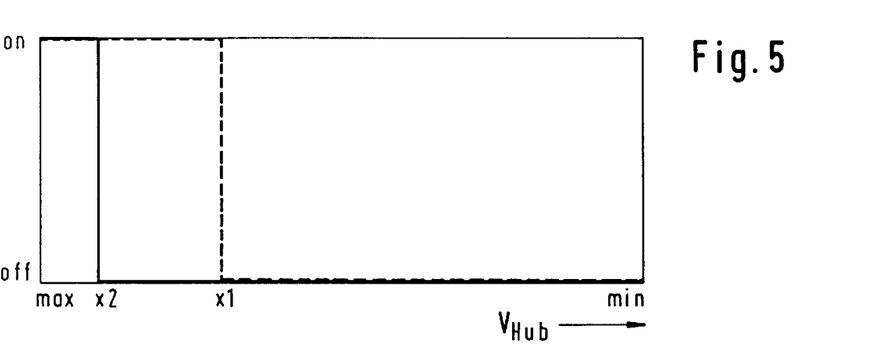
FIG. 5 shows the operating state of the condenser blower as a function of the destrokes degree or swept volume of the compressor.

FIG. 5 illustrates the dependence of the operating state of the condenser blower on the destroke level or swept volume $V_{swept}$ of the compressor. The example illustrates the mode of operation for a condenser blower which can be operated only at a specific speed, so that a distinction is made exclusively between two operating states, specifically "condenser blower off" and "condenser blower on." Plotted on the horizontal axis in FIG. 5 is the swept volume $V_{swept}$ of the compressor, the left-hand end marking the maximum swept volume and the right-hand end the minimum swept volume. During operation of the compressor at maximum swept volume $V_{swept}$ per revolution of the compressor, the condenser blower is switched on. Upon reduction in the swept volume $V_{swept}$, in accordance with the dashed line in FIG. 5, the condenser blower initially remains switched on until a destroke level is reached which corresponds to the distance x1 in FIG. 5. As soon as this signal for the destroke level is present, the condenser blower is switched off, with the result that no further power is fed to the relevant drive motor. Given further reduction in the swept volume $V_{swept}$, the condenser blower continues to remain switched off.

Given an enlargement of the swept volume $V_{swept}$ in the case of an increased demand on the compressor performance, the condenser blower is switched on only upon reaching a distance x2 from the maximum swept volume, since a rise in the condenser output is not required until such an operating state of the compressor is realized. The result of establishing the distances x1 and x2 from the maximum possible volumetric capacity, is that there is a clear spacing between the switching-off and switching-on criteria of the condenser blower. Frequent changes of the controls which would lead to oscillations in the system are thereby avoided.

Figure 6A:
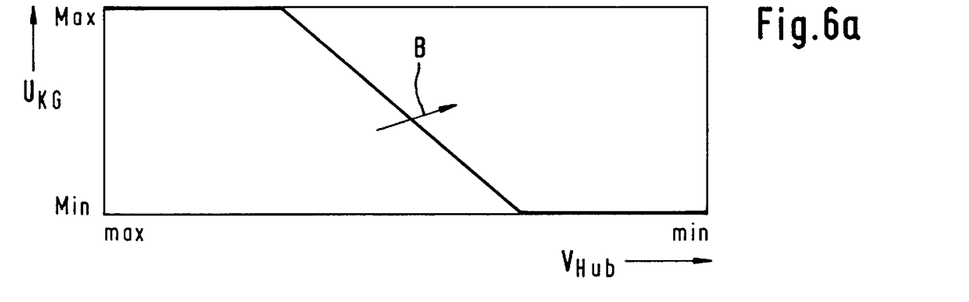
FIGS. 6a and 6b show the voltage of the condenser blower as a function of the evaporator temperature.
Figure 6B:
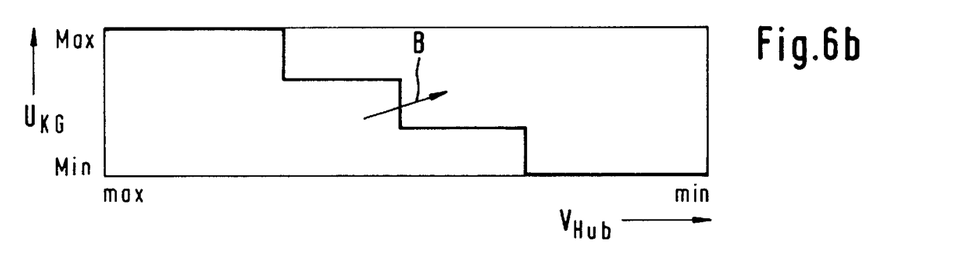

FIGS. 6a and 6b show the voltage $U_{KG}$ of the condenser blower as a function of the swept volume of the compressor $V_{swept}$. In this case, a stepless control is shown in FIG. 6a, and a control performed in several control steps is shown in FIG. 6b. In accordance with arrow B, these curves can be displaced as a function of the output-side pressure of the condenser.

Figure 7:
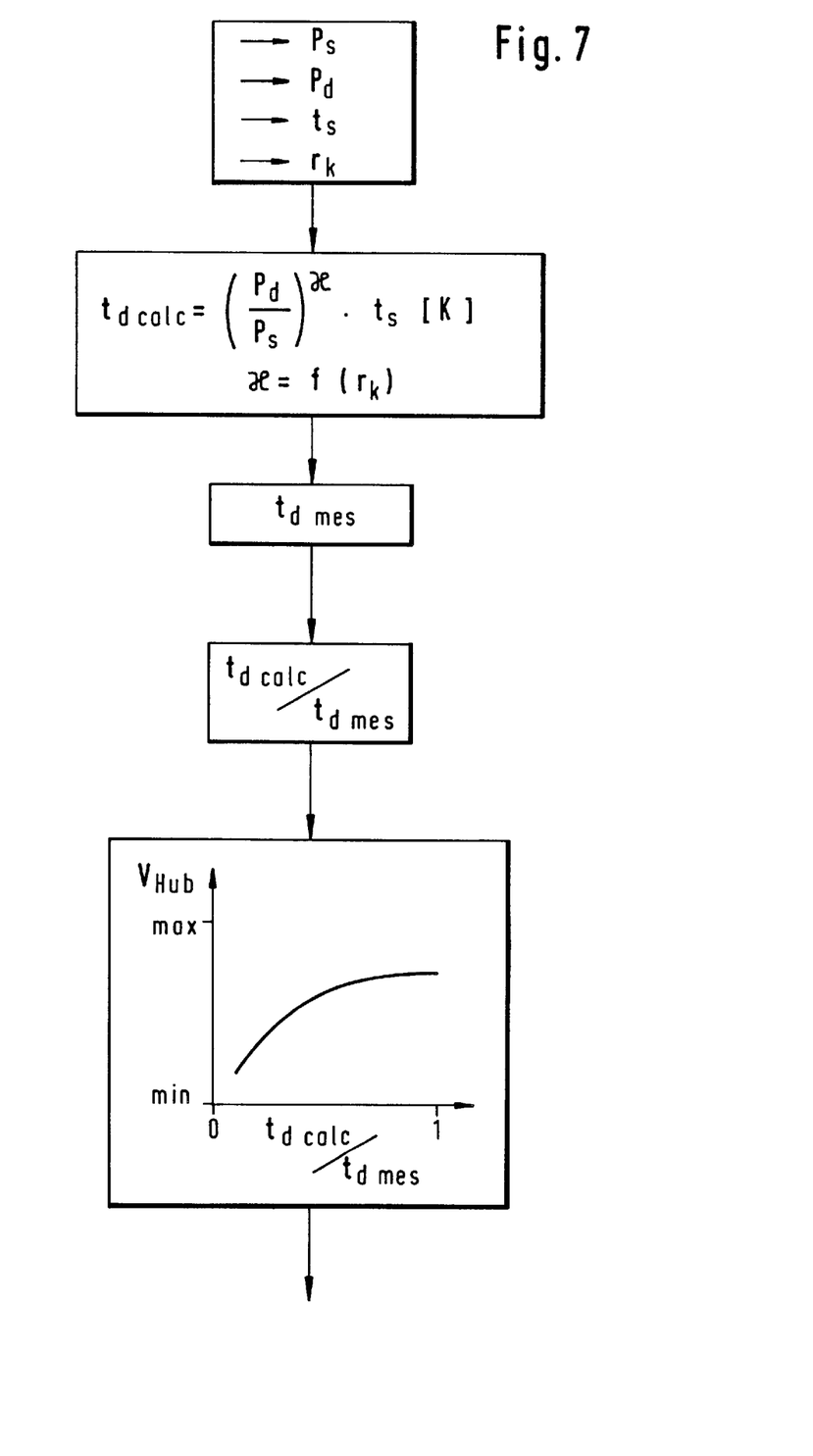
FIG. 7 shows a flow chart for calculating the hot gas temperature.

FIG. 7 shows a flow chart relating to the calculation of the hot gas temperature and the comparison with the actually detected value, from which it is finally determined whether the output-controlled compressor is operating outside its maximum volumetric capacity. The hot gas temperature for operation under full load, that is to say at maximum volumetric capacity, can be determined on the basis of the known output data of the compressor. In this case, the following function holds for the hot gas temperature $$t_{d\ cal} = f(P_s, P_d, t_s, r_k).$$

It is thus possible to calculate the hypothetical hot gas temperature which would result in the case of full compressor load from the suction pressure $P_s$, the high pressure $P_d$, the suction gas temperature $t_s$ and the speed of the compressor $r_k$.

In accordance with the flow chart represented in FIG. 7, in a first step the suction pressure $P_s$, the high pressure $P_d$, the suction gas temperature $t_s$ and the compressor speed $r_k$ are measured. In a second step, the hypothetical hot gas temperature is calculated in accordance with the formula specified in FIG. 7. In a third step, the hot gas temperature $t_{d\ mes}$ actually present is detected on the high-pressure side of the compressor and compared with the value from the previously calculated hypothetical hot gas temperature $t_{d\ calc}$, as is specified in the fourth step of FIG. 7. On the basis of this comparison, in a fifth step, the destroke level is determined in accordance with a prescribed function, the represented curve being a function of the parameters specified in the first step. The destroke level determined in step 5 is passed on as information, in order to undertake in an appropriate way the driving of actuators for output-control components of the air conditioner.

The invention has been described with reference to particularly preferred embodiments. Those skilled in the art understand, however, that various modifications may be made to the invention without significantly departing from the spirit and scope thereof. The priority document German Patent Application 197 13 197.2, filed on Mar. 28, 1997, is incorporated herein by reference in its entirety. All other documents described herein, including EP 0 288 658 B1 and EPO 520 628 A2 also are incorporated herein by reference in their entirety.

What is claimed is:

1. A method for operating an air conditioner in a motor vehicle, whereby the air conditioner comprises a refrigerant circuit including:
   an evaporator;
   a compressor driven by an engine, said compressor being output-controlled;
   a condenser;
   an expansion device; and
   an electronic control device in electronic communication with said refrigerant circuit which, as a function of input signals, generates output signals for driving actuators for output-controlled components of the air conditioner,
   whereby the evaporator and the condenser each are assigned a blower for applying an air flow, and wherein said evaporator, compressor, condenser and expansion device are in fluid communication with one another;
   the method comprising:
   detecting at least two state variables of the refrigerant circuit;
   determining a value relating to the current delivery rate of the compressor ($V_{stroke}$), said value being derived from the at least two state variables detected; and
   determining whether the compressor is being operated outside its maximum delivery rate by comparing said determined value with a predetermined value for the maximum delivery rate of the compressor ($V_{max}$).

2. The method as claimed in claim 1, wherein the refrigerant has a suction pressure ($P_s$) and a control space is provided in said compressor, said control space having a pressure ($P_k$) associated therewith, and wherein said detecting comprises measuring said suction pressure ($P_s$) of the refrigerant and said pressure ($P_k$) in the control space of the compressor, and forming a differential signal from the corresponding signals.

3. The method as claimed in claim 1, wherein said detecting comprises measuring a suction pressure ($P_s$) and a high pressure ($P_d$) of the refrigerant as well as a speed ($r_k$) of a compressor shaft.

4. The method as claimed in claim 1, wherein said method comprises detecting a high pressure ($P_d$) of the refrigerant, a speed ($r_k$) of a compressor shaft, an inside air temperature, an outside air temperature, a humidity level of air fed to the evaporator, and a voltage of a blower assigned to the evaporator;
   calculating a comparison value for the maximum delivery rate of the compressor;
   measuring the actual delivery rate of the compressor; and
   comparing the comparison value with the actual delivery rate, to determine whether the compressor is being operated outside its maximum delivery rate.

5. The method as claimed in claim 1, wherein the method comprises:
   detecting values of a voltage of the blower assigned to the evaporator, an air inlet temperature, humidity of air flowing into the evaporator, a refrigerant temperature downstream of the evaporator and a position of respective air flaps disposed within flow channels of the air conditioner;
   calculating a value relating to the current delivery rate ($V_{stroke}$) of the compressor from the values detected in the preceding step; and
   comparing said value relating to the current delivery rate with a value prescribed for the refrigerating performance at maximum delivery rate ($V_{max}$), to determine whether the compressor is being operated outside its maximum delivery rate.

6. The method as claimed in claim 1, wherein the method comprises:
   calculating refrigerating power for the refrigerating performance at maximum delivery rate ($V_{max}$) from the parameters decisive for a condensing unit characteristic; and
   comparing the actual refrigerating performance with the calculated refrigerating power for the refrigerating performance, to determine whether the compressor is being operated outside its maximum delivery rate.

7. The method as claimed in claim 6, wherein calculating refrigerating power for the refrigerating performance at maximum delivery rate ($V_{max}$) from the parameters decisive for a condensing unit characteristic comprises detecting a speed ($r_k$) of a compressor shaft, a voltage ($U_{KG}$) of the blower assigned to the condenser, and the driving speed of the motor vehicle.

8. The method as claimed in claim 6, wherein calculating refrigerating power for the refrigerating performance at maximum delivery rate ($V_{max}$) from the parameters decisive for a condensing unit characteristic comprises detecting a speed ($r_k$) of a compressor shaft, a high pressure ($P_d$) of the refrigerant, a temperature on the output side of the condenser, and a suction gas temperature ($t_s$).

9. The method as claimed in claim 1, wherein the method comprises:
   detecting a suction pressure ($P_s$) and a high pressure ($P_d$) of the refrigerant, a suction gas temperature ($t_s$) and a speed ($r_k$) of a compressor shaft,
   calculating a value of the hot gas temperature ($t_{d\ calc}$) for operating at maximum delivery rate ($V_{max}$) of the compressor from the values detected in the preceding step; and
   comparing the value of the hot gas temperature ($t_{d\ calc}$) with the actually measured hot gas temperature ($t_{d\ mes}$), to determine whether the compressor is being operated outside its maximum delivery rate.

10. The method as claimed in claim 1, further comprising:
    reducing voltage ($U_{KG}$) applied to the blower assigned to the condenser based on a signal whether the compressor is being operated outside its maximum delivery rate and based on a difference between a desired evaporator temperature value and an actual evaporator temperature value.

11. The method as claimed in claim 10, wherein the voltage ($U_{KG}$) of the condenser blower is reduced to an intermediate level.

12. The method as claimed in claim 10, wherein the voltage ($U_{KG}$) of the condenser blower is reduced in one or more steps.

13. The method as claimed in claim 11, wherein the reduction in the voltage ($U_{KG}$) is performed at a lower delivery rate of the compressor than the rise in the voltage.

14. The method as claimed in claim 12, wherein the reduction in the voltage ($U_{KG}$) is performed at a lower delivery rate of the compressor than the rise in the voltage.

15. An air conditioner for a motor vehicle having a refrigerant circuit which comprises:

an evaporator having a blower assigned thereto;

an output-controlled compressor that can be driven by means of an engine;

a condenser having a blower assigned thereto;

an expansion device, said evaporator, compressor, condenser and expansion device each being in fluid communication with one another;

an electronic control device in electronic communication with said refrigeration circuit, said electronic control device being connected to (a) sensors for detecting the state variables selected from the group consisting of high pressure of the refrigerant, speed of a compressor shaft, passenger compartment temperature and outside air temperature, and (b) actuators of output-controlled components;

a measuring device for measuring the voltage of at least one of the evaporator blower and the condenser blower; and sensors for detecting the humidity and temperature of the air fed to the evaporator.

16. An air conditioner for a motor vehicle having a refrigerant circuit which comprises:

an evaporator having a blower assigned thereto;

an output-controlled compressor that can be driven by means of an engine;

a condenser having a blower assigned thereto;

an expansion device, said evaporator, compressor, condenser and expansion device each being in fluid communication with one another;

an electronic control device in electronic communication with said refrigeration circuit, said electronic control device being connected to a plurality of sensors for detecting state variables of the air conditioner and to an actuator of at least one output-controlled component;

a first sensor for detecting the pressure in a control space of the compressor and for generating a first signal representative of said control space pressure;

a second sensor for detecting the suction pressure in a suction line of the compressor and for generating a second signal representative of said suction line pressure; and an evaluation circuit arranged downstream of the first and second sensors for producing a differential signal from said first and second signals, and for supplying said differential signal to said electronic control device as a basis for determining whether the compressor is being operated outside its maximum delivery rate.

17. The method as claimed in claim 1, further comprising generating a signal indicative of said determination whether the compressor is being operated outside its maximum delivery rate and inputting said generated signal to the control device.

18. The method as claimed in claim 17, further comprising controlling the operation of at least one output-controlled component of the air conditioner based on said signal indicative of said determination whether the compressor is being operated outside its maximum delivery rate.

19. An air conditioner as claimed in claim 15, wherein said condenser blower has an actuator connected to said electronic control device and constitutes one of said at least one output-controlled components, and wherein said electronic control device adjusts the voltage applied to at least said condenser blower in response to a determination that the compressor is being operated outside its maximum delivery rate.

20. An air conditioner for a motor vehicle, including a refrigerant circuit comprising:

an evaporator having a blower assigned thereto;

a compressor driven by an engine, said compressor being output-controlled;

a condenser having a blower assigned thereto;

an expansion device, wherein said evaporator, compressor, condenser and expansion device are in fluid communication with one another;

an electronic control means, in electronic communication with said refrigerant circuit, for generating, as a function of input signals, output signals for driving actuators for output-controlled components of the air conditioner;

means for detecting at least two state variables of the refrigerant circuit;

circuit means for determining a value relating to the current delivery rate of the compressor ($V_{stroke}$), said value being derived from the at least two state variables detected by said detecting means; and circuit means for determining whether the compressor is being operated outside its maximum delivery rate by comparing said determined value with a predetermined value for the maximum delivery rate of the compressor ($V_{max}$).

* * * * *